US012681884B1

(12) United States Patent
Rollins

(10) Patent No.: US 12,681,884 B1
(45) Date of Patent: Jul. 14, 2026

(54) AUTONOMOUS ETHERNET INTERFACE SPEED CONFIGURATION

(71) Applicant: Calix, Inc., San Jose, CA (US)

(72) Inventor: Michael T. Rollins, Santa Rosa, CA (US)

(73) Assignee: Calix, Inc., San Jose, CA (US)

( * ) Notice: Subject to any disclaimer, the term of this patent is extended or adjusted under 35 U.S.C. 154(b) by 170 days.

(21) Appl. No.: 18/437,749

(22) Filed: Feb. 9, 2024

(51) Int. Cl.
*G06F 13/40* (2006.01)
*G06F 13/42* (2006.01)

(52) U.S. Cl.
CPC ...... *G06F 13/4068* (2013.01); *G06F 13/4221* (2013.01); *G06F 13/4282* (2013.01); *G06F 2213/0016* (2013.01); *G06F 2213/0026* (2013.01)

(58) Field of Classification Search
CPC ............. G06F 13/4068; G06F 13/4221; G06F 13/4282; G06F 2213/0016; G06F 2213/0026
See application file for complete search history.

(56) References Cited

U.S. PATENT DOCUMENTS

| | | | | |
|---|---|---|---|---|
| 7,774,424 | B1 * | 8/2010 | Bailey | ................... G06F 13/385 709/217 |
| 7,814,255 | B1 * | 10/2010 | Deva | ................... G06F 13/4081 710/10 |
| 2007/0147835 | A1 * | 6/2007 | Kim | ...................... H04J 14/025 398/71 |
| 2012/0311362 | A1 * | 12/2012 | Sawada | ................. G06F 1/3278 713/323 |
| 2019/0229895 | A1 * | 7/2019 | Finkelstein | ............ H04B 10/40 |
| 2020/0201637 | A1 * | 6/2020 | Mouchel La Fosse | ...................... H03K 19/17748 |
| 2020/0401549 | A1 * | 12/2020 | Usach Merino | .... G06F 11/0772 |

* cited by examiner

*Primary Examiner* — Eric T Oberly
(74) *Attorney, Agent, or Firm* — Staniford Tomita LLP

(57) ABSTRACT

Automatically configuring a pluggable module installed in an Ethernet system by probing the module using an interface protocol to identify a type and data transfer rate of the module and determine whether or not the type and data transfer rate are correct for a Ethernet data layer and physical (PHY) layer device of the system. If so, the automated process enables the PHY interface through a control bus coupled to a host CPU to operate the module at a desired data transfer rate, otherwise it reconfigures the PHY to a type determined through the probing step, or sets the PHY data transfer rate to the data transfer rate determined by the probing step. This improves present methods where an operator must identify the type/rate of the device installed in a switch and then manually configure the port to the correct rate, which is an inherently error prone process.

20 Claims, 4 Drawing Sheets

100

| DEVICES | DEVICE PARAMETERS |
|---|---|
| 1 Gigabit MAC PHY | Duplex |
| 10 Gigabit MAC PHY | DWDM-Channel |
| 40 Gigabit MAC PHY | Forward-Error-Correction |
| 100 Gigabit MAC PHY | Flow-Control |
| 400 Gigabit MAC PHY | MTU |
|  | Speed |
|  | Unreliable-Loss-of-Signal |

400

AUTONOMOUS ETHERNET INTERFACE SPEED CONFIGURATION

TECHNICAL FIELD

Embodiments are directed to computer networks, and specifically to improving the configuration process for Ethernet-based networks.

BACKGROUND

Modern networking devices allow different line rate types of optical line modules to be inserted into a mechanical module enclosure resident in a switch. These are then terminated on the internal Ethernet physical (PHY) device present in the switching device. In present systems, the operator must manually identify the type and line rate of the device to be installed in a switch and then manually configure the port to the correct rate. The operator must thus consider the rate supported by the optical pluggable module and then configure the Ethernet PHY device to correctly set the line rate to align with the rate supported by the optical pluggable device. This configuration process is often very time and resource intensive as it requires the operator to access the devices, make certain determinations, and then manually input the proper information into the corresponding devices. It also represents a potential source of problems, as operator error is always possible.

What is needed, therefore, is a system and method that reduces the configuration burden on the end user operator and to reduce operator misconfiguration of the speed of Ethernet interfaces.

The subject matter discussed in the background section should not be assumed to be prior art merely as a result of its mention in the background section. Similarly, a problem mentioned in the background section or associated with the subject matter of the background section should not be assumed to have been previously recognized in the prior art. The subject matter in the background section merely represents different approaches, which in and of themselves may also be inventions.

BRIEF DESCRIPTION OF THE DRAWINGS

In the following drawings like reference numerals designate like structural elements. Although the figures depict various examples, the one or more embodiments and implementations described herein are not limited to the examples depicted in the figures.

DETAILED DESCRIPTION

A detailed description of one or more embodiments is provided below along with accompanying figures that illustrate the principles of the described embodiments. While aspects of the invention are described in conjunction with such embodiments, it should be understood that it is not limited to any one embodiment. On the contrary, the scope is limited only by the claims and the invention encompasses numerous alternatives, modifications, and equivalents. For the purpose of example, numerous specific details are set forth in the following description in order to provide a thorough understanding of the described embodiments, which may be practiced according to the claims without some or all of these specific details. For the purpose of clarity, technical material that is known in the technical fields related to the embodiments has not been described in detail so that the described embodiments are not unnecessarily obscured.

It should be appreciated that the described embodiments can be implemented in numerous ways, including as a process, an apparatus, a system, a device, a method, or a computer-readable medium such as a computer-readable storage medium containing computer-readable instructions or computer program code, or as a computer program product, comprising a computer-usable medium having a computer-readable program code embodied therein.

Software programs or computer-readable instructions may be referred to as components or modules. The programs may be hardwired or hard coded in hardware or take the form of software executing on a general-purpose computer or be hardwired or hard coded in hardware such that when the software is loaded into and/or executed by the computer, the computer becomes an apparatus for practicing the invention. In this specification, these implementations, or any other form that the invention may take, may be referred to as techniques. In general, the order of the steps of disclosed processes may be altered within the scope of the described embodiments.

Embodiments are directed to systems and methods of implementing a process that uses a code algorithm implemented in system firmware or as software running on a host CPU that manages an Ethernet switch. This program will automatically probe each optical module connected to the switch to learn its device type and speed. It will then set the speed of the Ethernet PHY device that is connected to the optical module. The speed configuration step may also reconfigure PHY driver functionality if PHY driver reconfiguration is necessary, such as in the case of changing a 4-channel PHY device from 4×1 operation to 4×4 operation, for example.

Figures 1A, 1B:
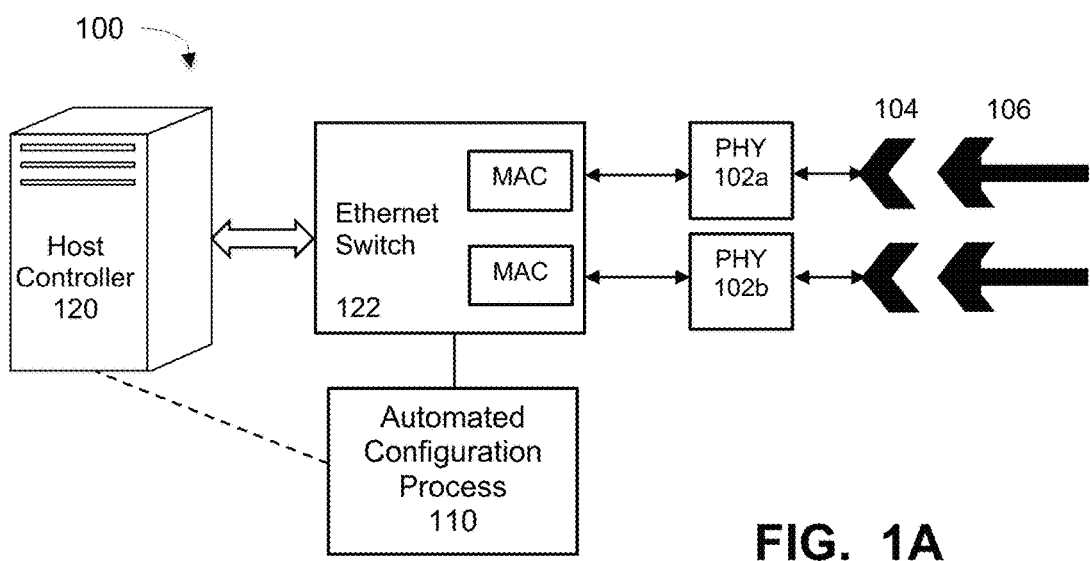
FIG. 1A illustrates an Ethernet network implementing a process for autonomously configuring interface speeds, under some embodiments.
FIG. 1B is a table that lists some example system devices and parameters, under some embodiments.

FIG. 1A illustrates a system implementing a process for autonomously configuring the Ethernet interface speed, under some embodiments. As shown in FIG. 1A, system 100 includes a host controller 120 coupled to and controlling an Ethernet switch 122, which provides switchable coupling for a number of connected devices, such as computers, storage, I/O devices, transmission devices (routers, buffers, etc.), and other processing devices. In general, the Ethernet interface specification (IEEE 802.3) is widely used in modern data systems as it provides very high data rates (Gigabit/second or Gbps range) over long distances, such as on the order of kilometers when fiber optic cables are used.

In the Open Systems Interconnection (OSI) model, Ethernet covers Layer 1 (physical layer) and part of Layer 2 (data link layer). One of the elements of IEEE 802.3 is the Ethernet physical (PHY) layer, which is a transceiver component for transmitting and receiving data or Ethernet frames. The physical layer specifies the types of electrical signals, signaling rates, media and connector types, and network topologies. As shown in FIG. 1A, PHY devices 102*a* and 102*b* are coupled between the Ethernet switch 122 and input ports 104 that provide connection to respective connectors 106 from the networked devices.

The PHY interface codes and decodes the data between a digital host system and the signal medium 106, and the data link layer defines the frame structure for the transmitted and received message data. In an Ethernet system, this data link layer function is performed by a media access control (MAC) component, as shown as integrated within switch 122. A PHY thus connects a link layer device (MAC) to the physical medium (e.g., optical fiber or copper cable), and a PHY device typically includes both physical coding sublayer (PCS) and physical medium dependent (PMD) layer functionality.

It should be noted that FIG. 1A is provided for purposes of example only, and Ethernet systems incorporating processing component 110 may be of any other configuration. For example, PHYs can be discrete components (as shown) or they can also be integrated into Ethernet controllers. Likewise, the MAC elements may be incorporated into the switch (as shown) or integrated into other elements, such as controllers, and so on. Any practical number of MAC elements, PHYs and physical interfaces 104 may also be used.

The devices that are coupled to the Ethernet switch 122 may be of many different types, each requiring different configuration requirements. The data rate or transmission speed of a device is a primary parameter, and other example parameters include port name, duplex mode (half/full), pause mode (symmetric/asymmetric), and others. Example configuration settings may thus be expressed as 10 Mbps Half, 1 Gbps Half, 10 Mbps Full, 100 Gbps Half, and so on.

FIG. 1B is a table that lists some example system devices and parameters, under some embodiments. As shown in FIG. 1B, table 130 lists certain devices MAC PHY devices, such having different rates, such as 1, 10, 40, 100, and 400 Gigabit/second. The possible parameters for such devices include attributes: duplex, dwdm-channel (Dense wavelength-division multiplexing), forward-error-correction, flow-control, MTU (maximum transmission unit), speed, and unreliable-loss-of-signal. FIG. 1B is provided for purposes of example, and other devices and parameters are possible.

In general, a MAC PHY device can run at its stated speed and may be configured to run at any of the ordinal rates that are at the maximum stated speed or lower. For example a 10 Gigabit MAC may be configured to run at its default rate of 10 Gbps, or it may be configured to run at a lower rate of 1 Gbps.

The setting of PHY speed configuration may be achieved by having the host CPU program the device speed register to the desired line rate. Other device registers or configuration mechanisms may also be used, depending on the device and system configuration.

Certain MAC PHY devices may be configured to run in a 1:1 mode, or they may be configured to support a multiplexed set of interfaces and a divided line rate. For example, a 100 Gigabit MAC PHY device may be configured to run in single mode of 100 Gbps or it may be configured to run as a quad set of four 10 Gbps interfaces. This reconfiguration also applies to the 400 Gigabit MAC PHY where it can run at 400 Gbps or as a quad set of four 100 Gbps interfaces.

The setting of the PHY configuration may be achieved by having the host CPU program the device control register to set the configuration of 1:1 or 1:4, or any other appropriate configuration setting. Various types of single (1:1) and quad (1:4) modules may be supported, such as: SFP, XFP, SFP+, QSFP, QSFP28, QSFP-DD and OSFP, among others.

To simplify and automate the configuration process, system 100 includes an automatic device configuration process 110 that automates the process of configuring devices connected to the host controller 120 through Ethernet switch 122 to and interfaces 104/106. Process 110 may comprise a software program, firmware, hardware circuitry, or any combination thereof, that is accessed or executed by or within the Ethernet switch 122 or host controller 120.

To aid in the autonomous reconfiguration of the MAC PHY, the modules are probed. All module types have a pair of internal registers that specify connector type, transceiver type, and bit-rate. These are typically read-only registers, and the values stored therein help in determining what action to take in setting PHY speed and/or reconfiguring the PHY, as described in greater detail below.

Figure 2:
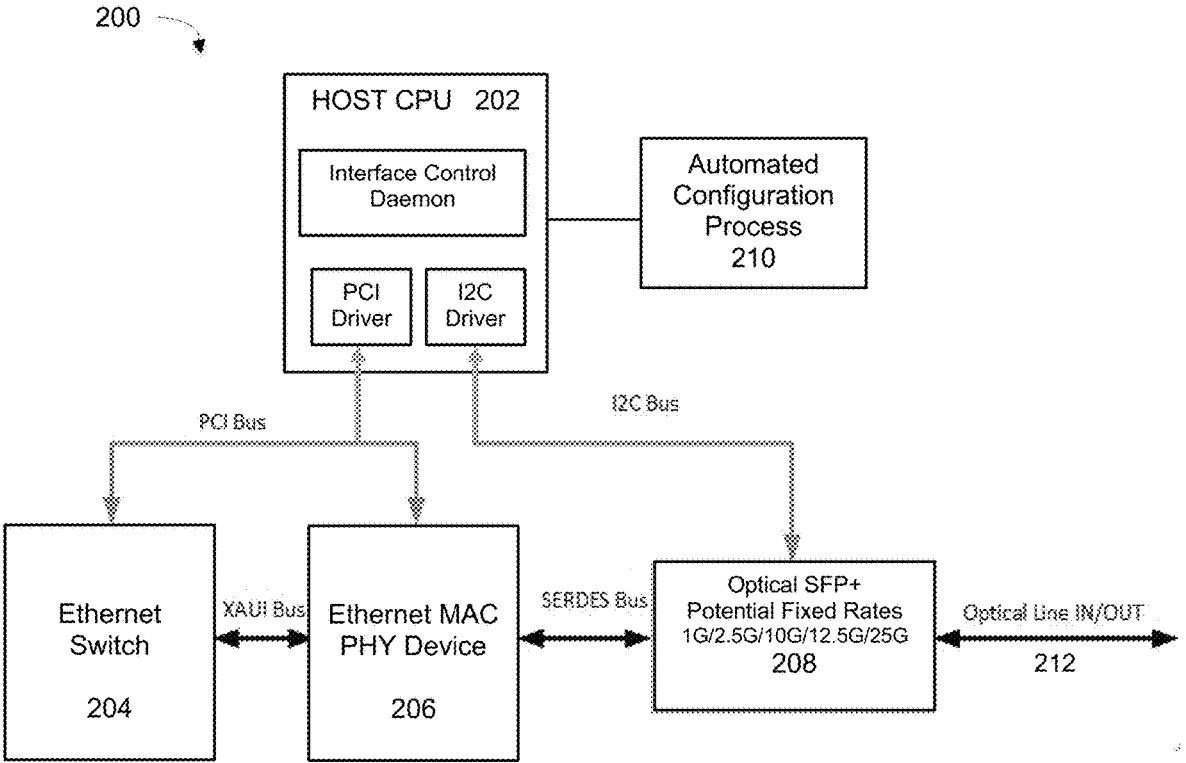
FIG. 2 is a block diagram of an Ethernet system including an automated device configuration processing component for a first type of optical transceiver interface, under some embodiments.

FIG. 2 is a block diagram of an Ethernet system including an automated device configuration processing component for a first type of optical transceiver interface, under some embodiments. As shown in FIG. 2, system 200 includes a host CPU 202 that is resident on the switching device used to run the software that manages the Ethernet switch 204.

The host CPU 202 includes an interface control daemon process that controls data flow over various interface busses, such as a PCI bus through a PCI driver, and an I2C bus through an I2C driver, for example.

The PCI bus communicates with the Ethernet switch 204 and the Ethernet MAC PHY device 206. The PHY device 206 comprises a standards-based Ethernet physical interface that implements the standard in Ethernet protocol data frames, and uses a PHY driver that can be Aost resident software executable code used to manage the PHY device.

The I2C bus is an industry-standard Inter-Integrated Serial Interface that is used to probe and read information in an optical module 208. This module is connected to the optical line I/O interface 212, and comprises an industry-standard based optical line transceiver as specified in MSA standards governing pluggable devices in SFP/SFP+, CSFP, XFP, QSFP-DD, QSFP28, CDFP, and related transceiver devices.

The I2C bus is as standard bi-directional interface that uses a controller as a master to communication with slave devices, which may not transmit data unless it has been addressed by the master. Slave devices typically require configuration upon startup to set the behavior of the device, and this is typically accomplished by accessing the internal register maps of the slave device, and each device can have one or more registers where data is stored and accessed.

In an embodiment, the interface 212 is a Gigabit Ethernet port for fiber optic media, where units work in pairs with a transceiver on each end of the link. Any network cable connected to the port (e.g., RJ-45) on one unit is transported to the corresponding port on the second unit. Generally the interface is non-IP addressable and any network traffic traveling through the fiber link remains unmodified, and any two devices that are connected over the fiber link appear to be directly connected by a standard network cable.

The devices connected to system 200 over optical interface 212 are generally pluggable devices that are provided and deployed under a Multi-Source Agreement (MSA), which is a multi-vendor specification defining transceiver form-factors as well as the management interface of such devices.

As mentioned above, devices plugged into system 200 must be configured by an operator or user of the system to ensure proper operation. System 200 includes an automated configuration process 210 to provide autonomous management of module speed and Ethernet PHY settings, among other parameters.

Figure 3:
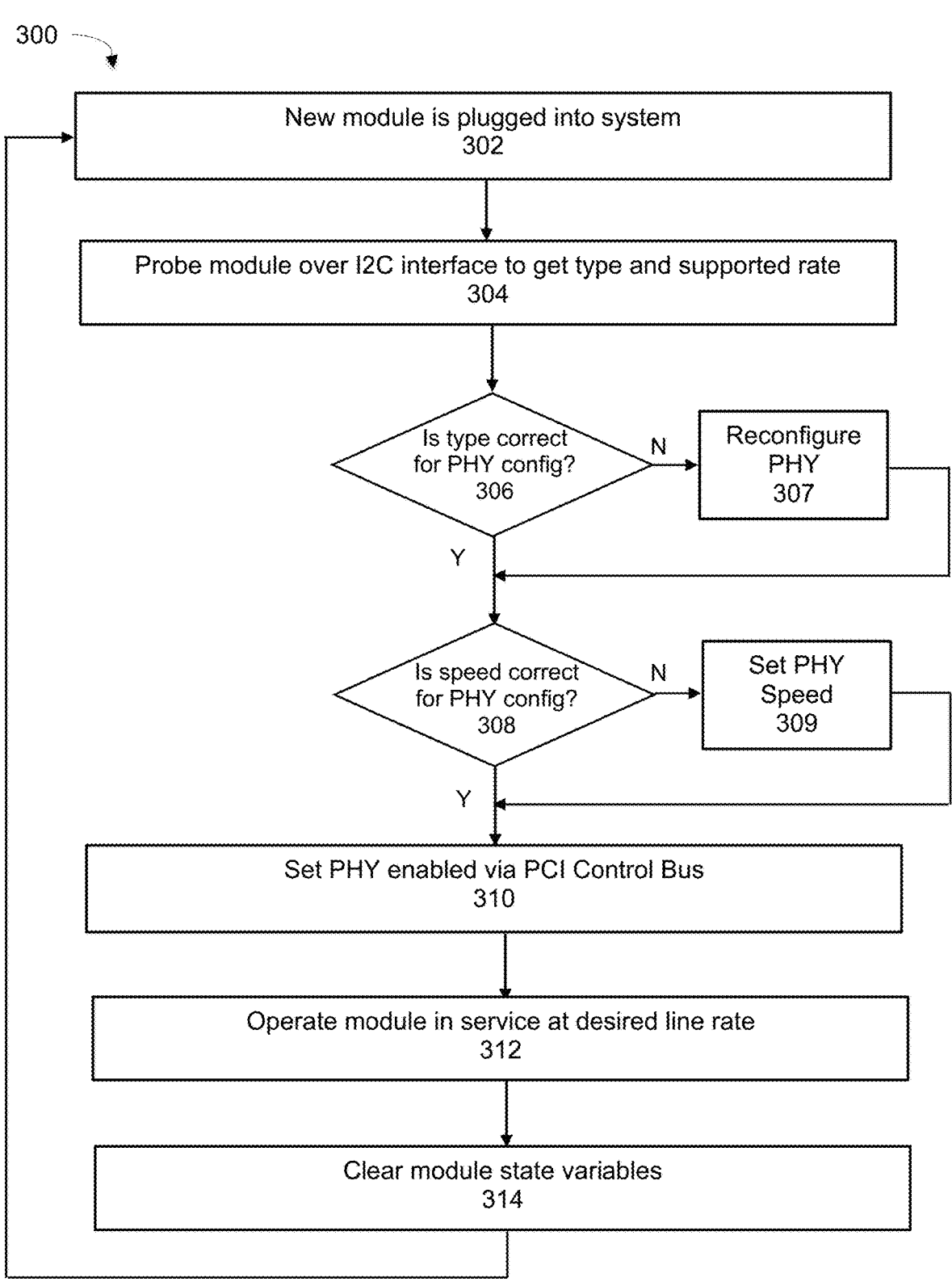
FIG. 3 is a flowchart that illustrates a method of automatically configuring an Ethernet system, under some embodiments.

FIG. 3 is a flowchart that illustrates a method of automatically configuring an Ethernet system, under some embodiments. As shown in FIG. 3, process 300 begins with a new module being plugged (or re-plugged) into the system, 302. The module is probed via the module's I2C interface to determine the type and supported rate of the device, 304. If the PHY device needs to be reconfigured to support the new module type, the reconfiguration of the device is performed through two decision steps, 306 and 308. First the process determines if the module type is correct for the PHY/driver configuration, 306. If not, the PHY/driver is reconfigured accordingly, 307. If this reconfiguration fails, an alarm is set to notify the operator.

If the type is correct, the process next determines in step 308 whether or not the module speed is correct for the PHY speed setting. If not, the speed of the module is set into the PHY device, 309. If this speed setting fails, an alarm is set to notify the operator, otherwise the process continues to step 310. In this step, the module/PHY combination (also known as the "interface") is placed in service if so configured. The module is then operated in service at the desired line rate, 312, and the module state variables are then cleared, 314. The process 300 loops back to step 302 each time a new module is plugged into the system.

In an embodiment, the solution of FIG. 3 allows for two specific use cases for the management of optical modules based on the physical form factor of the module types. The first use case applies to SFP+ type modules, and the second use case applies to QSFP type modules (e.g., QSFP-DD and QSFP-28 module types). These are two popular variations of the small form factor pluggable (SFP) transceiver type that are used to connect a switch or other network device to copper or fiber cable in a hot-swappable manner (i.e., while power is applied).

SFP transceivers support speeds up to 4.25 Gbps and are commonly used in telecommunications and data communications applications. SFP+ is an updated version that supports higher speeds up to 10 Gbps. This increased data rate also reduces the transmission distance, however, as SFP typically has a longer transmission distance. SFP+ specifications are based on SFF-8431. FIG. 2 illustrates the SFP+ use case, where the interface port 208 comprises optical SFP+ and supports potential fixed rates of 1 Gbps, 2.5 Gbps, 10 Gpbs, 12.5 Gbps, and 25 Gbps.

When applied to the SFP+ module type, certain restrictions apply to managed module through the automated configuration process 210. First, the I2C probe of the module data executed during the module discovery state will read from 2-wire MSA/SFP+ memory map SFP MSA data block at IC2 2 wire address base 0xA0H and at offset octet 12 in order to read the bit rate of the optical module. The data read should yield an ordinal line rate of 1 G, 2.5 G, 10 G, 12.5 G or 25 G. If the readback of the rate is not one of these rates its considered to be an error case and the process 300 will terminate in a fault condition.

The QSFP (or quad small form factor pluggable) is another type of compact, hot-swappable transceiver. It supports Ethernet, Fibre Channel, InfiniBand and SONET/SDH standards with different data rate options. QSFP modules are commonly available in several different types: 4×1 Gbps QSFP, 4×10 Gbps QSFP+, 4×28 Gbps QSFP28. QSFP+ and QSFP28 are both recent versions that support numerous 40 Gbps and 100 Gbps applications. Both QSFP+ and QSFP28 modules integrate four transmit and four receiver channels.

While QSFP+ supports 4×10 Gbps or 1×40 Gbps, and QSFP28 can support 4×25 Gbps, 2×50 Gbps or 1×100 Gbps, depending on the transceiver used. The specifications for QSFP are based on SFF-8436.

Figure 4:
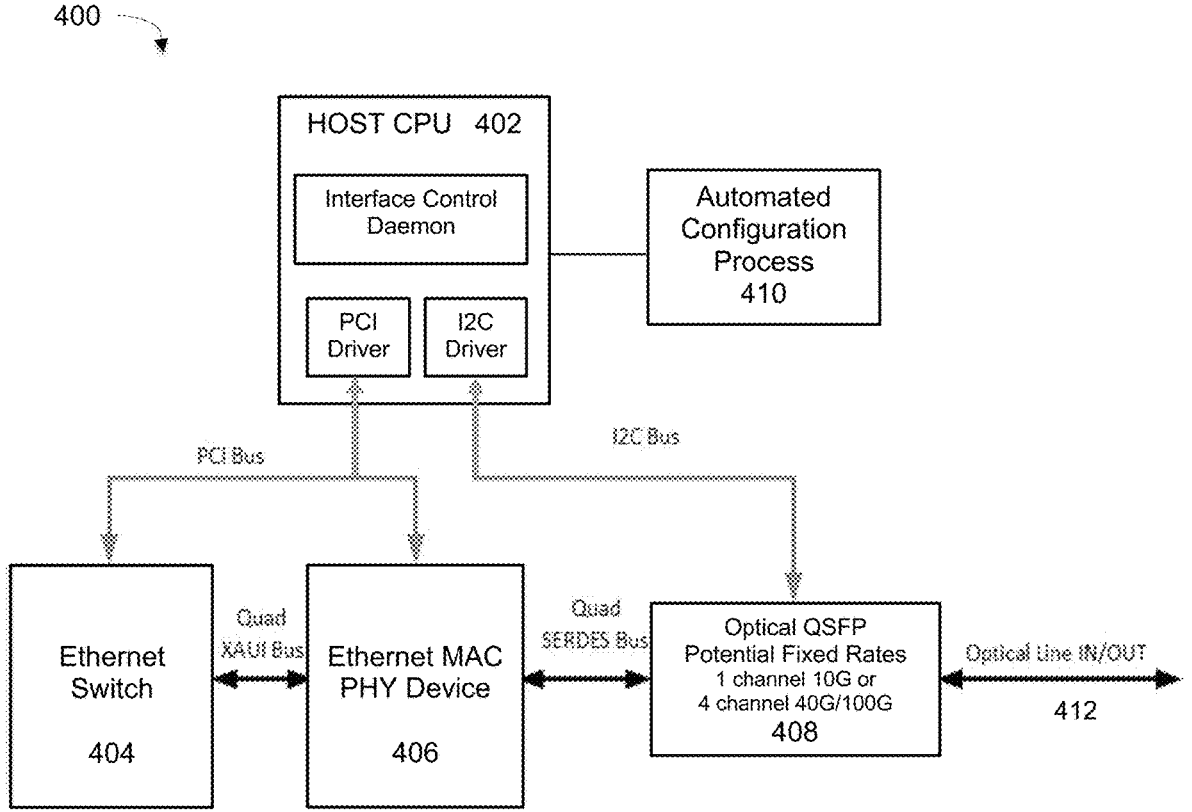
FIG. 4 is a block diagram of an Ethernet system including an automated device configuration processing component for a second type of optical transceiver interface, under some embodiments.

FIG. 4 illustrates the QSFP use case, where interface port 408 of system 400 comprises an optical QSFP transceiver 408 with potential fixed rates over interface 412 of one channel at 10 Gbps or four channels at 40 Gbps/100 Gbps. For this quad transceiver embodiment, the relevant busses between the Ethernet switch 404 and Ethernet MAC PHY device 406 and the optical transceiver 408, are all quad busses (e.g., quad XAUI bus and quad SERDES bus), as shown.

When applied to the QSFP module type, certain restrictions apply to managed module through the automated configuration process 410 and host CPU 402. First, the I2C probe of the module data executed during the module discovery state will read from 2-wire MSA/SFP+ memory map SFP MSA data block at IC2 2 wire address Upper Memory Map Page 00 h and at offset octet 140 in order to read the bit rate of the optical module. The data read should yield an ordinal line rate of 10 G, 40 G, 100 G, or 400G. If the readback of the rate is not one of these rates its considered to be an error case and the algorithm will terminate in a fault condition. The Ethernet MAC PHY devices 206 supports operation in one of two modes. The first mode is a 4-channel multiplexed mode where the channels are aggregated into a single logical channel (by default). The second mode of operation is where the four channels are demultiplexed into four separate channels. In the case where the detected optical module is running at 10G rate, the later mode of operation in the MAC PHY device is configured such that single channel is used and the remaining three channels are left in an idle state.

As stated above, all module types of FIGS. 2 and 4 use internal registers specifying connector type, transceiver type, and bit-rate. The stored values are used to determine what action to take in reconfiguring the PHY (step 307 of FIG. 3) and in setting PHY speed (step 310 of FIG. 3).

With reference back to FIG. 3 and based on the device types listed in table 130, to expand on step 307 for configuring the PHY, the connector type/transceiver type is read when the transceiver/module is discovered by the system. For example, for a 1 Gbps MAC PHY, if the transceiver type is SFP, no reconfiguration supported/needed of the PHY, and any other transceiver type is an error.

For type MAC PHY 10 Gbps, if the transceiver type is SFP, XFP, or SFP+, no reconfiguration supported/needed of the PHY, and any other transceiver type is an error.

For type MAC PHY 40 Gbps, if the transceiver type is 40 Gbps QSFP, the autonomous process sets the PHY configuration to 1:1, otherwise if transceiver type is: 10 Gbps SFP+, it sets the PHY configuration to 4:1, and any other transceiver type is an error.

For type MAC PHY 100 Gbps, if the transceiver type is 100 Gbps, the process sets the PHY configuration to 1:1, otherwise if the transceiver is 10 Gbps, the process sets the PHY configuration to 4:1, and any other transceiver type is an error.

For type MAC PHY 400 Gbps, if the transceiver type is 400 Gbps, the process sets the PHY configuration PHY to 1:1, otherwise if the transceiver is 100 Gbps, it sets the PHY configuration PHY to 4:1, and any other transceiver type is an error.

For step 310, based on transceiver bit-rate, the setting of the PHY speed may be achieved by having the host CPU program the device speed register to the desired speed. Once PHY configurations are set in step 307, in all cases for speed, if the user configuration is set to auto by the operator, the process reads transceiver supported bit-rate, and configures the MAC PHY device speed register to that rate; otherwise it configures the MAC PHY device speed register to ordinal rate configured by the operator for the interface Although embodiments are described with respect to specific transceiver types, such as SFP, SFP+, and QSFP, embodiments are not so limited, and other types may also be used.

Embodiments as described thus provide the ability of a networking switch/device to autonomously identify a module type, identify its line rate, and then configure the PHY device to the correct configuration and rate without requiring any operator intervention. This provides a plug and play mechanism for module insertion into the switch.

As compared to present methods of manual identification and configuration, embodiments simplify the operator's setup and maintenance of the switching device. This can speed the configuration process, reduce installation mistakes and thus lower the operators' operating expenses.

As described above, in an embodiment, system 100 includes an automatic Ethernet device configuration processing component that may be implemented as a computer implemented software process, or as a hardware component, or both in a computing device such as component 122 in FIG. 1A. As such, it may be an executable module executed by the one or more computers in the network, or it may be embodied as a hardware component or circuit provided in the system. The network environment of FIG. 1A may comprise any number of components coupled over the Internet or similar large-scale network or portion thereof. Each node in the network(s) comprises a computing device capable of executing software code to perform the processing steps described herein.

Such a device may include a processor, memory, interfaces, high-speed expansion ports, and interconnected busses. The processor can process instructions for execution within the computing device, including instructions stored in the memory or on a storage device to display graphical information for a (graphical user interface) GUI on an external input/output (I/O) device, such as a display coupled to high speed interface. In other implementations, multiple processors and/or multiple busses may be used, as appropriate, along with multiple memories and types of memory.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device. In an embodiment, an ASIC design can be used to implement system algorithms as well as hardware accelerated designs for specific use cases.

These computer programs (also known as programs, software, software applications or code) can include machine instructions for a programmable processor, and can be implemented in a high-level procedural and/or object-oriented programming language, and/or in assembly/machine language. As used herein, the terms "machine-readable medium" "computer-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

In the context of this disclosure, a computer-usable medium or computer-readable medium may be any physical medium that can contain or store the program for use by or in connection with the instruction execution system, apparatus or device. For example, the computer-readable storage medium or computer-usable medium may be, but is not limited to, a random-access memory (RAM), read-only memory (ROM), or a persistent store, such as a mass storage device, hard drives, CDROM, DVDROM, tape, erasable programmable read-only memory (EPROM or flash memory), or any magnetic, electromagnetic, optical, or electrical means or system, apparatus or device for storing information. Alternatively, or additionally, the computer-readable storage medium or computer-usable medium may be any combination of these devices or even paper or another suitable medium upon which the program code is printed, as the program code can be electronically captured, via, for instance, optical scanning of the paper or other medium, then compiled, interpreted, or otherwise processed in a suitable manner, if necessary, and then stored in a computer memory.

The present disclosure, in various embodiments, includes components, methods, processes, systems and/or apparatus substantially as depicted and described herein, including various embodiments, subcombinations, and subsets thereof. Those of ordinary skill in the art will understand how to make and use the present disclosure after understanding the present disclosure. The present disclosure, in various embodiments, includes providing devices and processes in the absence of items not depicted and/or described herein or in various embodiments hereof, including in the absence of such items as may have been used in previous devices or processes, e.g., for improving performance, achieving ease and/or reducing cost of implementation.

Unless the context clearly requires otherwise, throughout the description and the claims, the words "comprise," "comprising," and the like are to be construed in an inclusive sense as opposed to an exclusive or exhaustive sense; that is to say, in a sense of "including, but not limited to." Words using the singular or plural number also include the plural or singular number respectively. Additionally, the words "herein," "hereunder," "above," "below," and words of similar import refer to this application as a whole and not to any particular portions of this application. When the word "or" is used in reference to a list of two or more items, that word covers all of the following interpretations of the word: any of the items in the list, all of the items in the list and any combination of the items in the list.

All references cited herein are intended to be incorporated by reference. While one or more implementations have been described by way of example and in terms of the specific embodiments, it is to be understood that one or more implementations are not limited to the disclosed embodiments. To the contrary, it is intended to cover various modifications and similar arrangements as would be apparent to those skilled in the art. Therefore, the scope of the appended claims should be accorded the broadest interpretation so as to encompass all such modifications and similar arrangements.

What is claimed is:

1. A method of automatically configuring a pluggable module installed in an Ethernet system, comprising:

detecting installation of the module in a port of the Ethernet system;

providing a host CPU controlling an Ethernet switch of the Ethernet system with respect to device parameters including multiplexing mode, forward-error correction, flow control, maximum transmission unit speed, and unreliable loss of signal;

first configuring, by the host CPU, a device speed register to a selected line rate;

second configuring, by the host CPU, a device control register to a selected multiplexing mode;

automatically probing internal registers of the module using an interface protocol to identify a type and data transfer rate of the module; and determining whether or not the device parameters and data transfer rate are correct for a Ethernet data interface and physical (PHY) interface device of the Ethernet switch by the first and second configuring, and if so, enabling the PHY interface device through a control bus coupled to the host CPU to operate the module at a desired data transfer rate, otherwise reconfiguring the PHY interface device to a type determined through the automatic probing, or setting the PHY interface device data transfer rate to the data transfer rate determined by the automatic probing.

2. The method of claim 1 wherein the interface protocol to determine the type and data transfer rate of the module comprises an Inter-Integrated Serial Interface (I2C) protocol.

3. The method of claim 1 wherein the control bus coupling the host CPU to the PHY interface comprises a PCI bus.

4. The method of claim 1 wherein the PHY interface device comprises the Ethernet switch incorporating physical interfaces and corresponding media access controller (MAC) devices.

5. The method of claim 4 wherein the PHY interface device is coupled to the module through an optical transceiver.

6. The method of claim 5 wherein the optical transceiver comprises a small form factor pluggable (SFP) transceiver providing access to an optical cable coupling the module to the Ethernet system.

7. The method of claim 6 wherein the SFP transceiver comprises a SFP+ transceiver providing fixed line rates of 1 Gbps to 25 Gbps in a plurality of discrete rates.

8. The method of claim 6 wherein the SFP transceiver comprises a quad SFP (QSFP) transceiver providing fixed line rates of one channel at 10 Gbps or four channels at 40 Gbps to 100 Gbps.

9. A system for automatically configuring a pluggable module installed in an Ethernet system, comprising:

a monitor component detecting installation of the module in a port of the Ethernet system;

an Ethernet switch providing a switchable coupling for connected devices of the Ethernet system;

a host CPU controlling the Ethernet switch with respect to device parameters including multiplexing mode, forward-error correction, flow control, maximum transmission unit speed, and unreliable loss of signal, and first configuring a device speed register to a selected line rate, and second configuring a device control register to a selected multiplexing mode;

an interface automatically probing internal registers of the module using an interface protocol to identify a type and data transfer rate of the module; and an automatic configuration processing component determining whether or not the device parameters and data transfer rate are correct for a Ethernet data interface and physical (PHY) interface device of the Ethernet switch by the first and second configuring, and if so, enabling the PHY interface device through a control bus coupled to the host CPU to operate the module at a desired data transfer rate, otherwise reconfiguring the PHY interface device to a type determined through the automatic probing, or setting the PHY interface device data transfer rate to the data transfer rate determined by the automatic probing.

10. The system of claim 9 wherein the interface protocol to determine the type and data transfer rate of the module comprises an Inter-Integrated Serial Interface (I2C) protocol.

11. The system of claim 9 wherein the control bus coupling the host CPU to the PHY interface device comprises a PCI bus.

12. The system of claim 9 wherein the PHY interface device comprises the Ethernet switch incorporating physical interfaces and corresponding media access controller (MAC) devices.

13. The system of claim 12 wherein the PHY interface device is coupled to the module through an optical transceiver.

14. The system of claim 13 wherein the optical transceiver comprises a small form factor pluggable (SFP) transceiver providing access to an optical cable coupling the module to the system.

15. The system of claim 14 wherein the SFP transceiver comprises a SFP+ transceiver providing fixed line rates of 1 Gbps to 25 Gbps in a plurality of discrete rates.

16. The system of claim 15 wherein the SFP transceiver comprises a quad SFP (QSFP) transceiver providing fixed line rates of one channel at 10 Gbps or four channels at 40 Gbps to 100 Gbps.

17. A system for automatically configuring a pluggable module installed in an Ethernet system, comprising:

a host computer configured to control data transmission through the module over an optical medium of the Ethernet system, wherein the host computer first configures a device speed register to a selected line rate, and second configures a device control register to a selected multiplexing mode;

an Ethernet switch coupled to the host computer through a first control bus, wherein the host computer controls the Ethernet switch with respect to device parameters including multiplexing mode, forward-error correction, flow control, maximum transmission unit speed, and unreliable loss of signal;

an Ethernet media access controller (MAC) and physical layer (PHY) interface device coupled to the host computer through the first control bus and to the Ethernet switch through a first direct bus;

an optical transceiver coupled to the host computer through a second control bus and the MAC and PHY interface device through a second direct bus; and an automated configuration component determining if the device parameters and data transfer rate of the module conforms to the first and second configuring.

18. The system of claim 17 wherein the automated configuration component reconfigures the PHY interface device to a type determined for the module, or sets a PHY interface device data transfer rate to the data transfer rate determined for the module if either the type or data transfer rate of the module does not conform.

19. The system of claim 18 wherein the optical transceiver comprises a small form factor pluggable (SFP) transceiver.

20. The system of claim 19 wherein the SFP transceiver comprises one of: a SFP+ transceiver providing fixed line rates of 1 Gbps to 25 Gbps in a plurality of discrete rates, or a quad SFP (QSFP) transceiver providing fixed line rates of one channel at 10 Gbps or four channels at 40 Gbps to 100 Gbps.

* * * * *